Nov. 21, 1933.  L. Y. SQUIBB  1,935,732

ELECTRICAL MEASURING APPARATUS

Filed June 2, 1932  5 Sheets-Sheet 1

INVENTOR.
Lloyd Y. Squibb
BY
Cornelius D. Ehret
his ATTORNEY.

Nov. 21, 1933.　　　　L. Y. SQUIBB　　　　1,935,732
ELECTRICAL MEASURING APPARATUS
Filed June 2, 1932　　5 Sheets-Sheet 4

INVENTOR.
Lloyd Y. Squibb
BY
Cornelius D. Ehret
his ATTORNEY.

Nov. 21, 1933.  L. Y. SQUIBB  1,935,732
ELECTRICAL MEASURING APPARATUS
Filed June 2, 1932   5 Sheets-Sheet 5

INVENTOR
Lloyd Y. Squibb
BY
his ATTORNEY

Patented Nov. 21, 1933

1,935,732

UNITED STATES PATENT OFFICE 1,935,732

ELECTRICAL MEASURING APPARATUS

Lloyd Y. Squibb, Camden, N. J., assignor to Leeds & Northrup Company, Philadelphia, Pa., a corporation of Pennsylvania Application June 2, 1932. Serial No. 614,890

30 Claims. (Cl. 171—95)

My invention relates to systems of and apparatus for measuring, indicating, recording, or controlling electrical, physical, chemical or other conditions and more particularly to apparatus of which it is characteristic that the deflections of an instrument in response to changes of temperature, pressure, or other conditions are utilized to vary the position of an indicating, recording or control structure through a disengageable connection as a clutch.

In accordance with my invention, a pair of feelers biased toward each other, as by a spring, are intermittently moved away from each other on opposite sides of the movable element of the instrument, for example, the pointer of a galvanometer, which is intermittently clamped; and upon release of the feelers, one of them depending upon the sense of the pointer deflection from a neutral position may engage the pointer, and the movement of the other or free feeler, by the biasing spring, moves a clutch member, for example, through a distance related to the extent of the pointer deflection.

Further in accordance with my invention, increased sensitivity and speed are attained by providing for a substantial increase of the part of the cycle in which the galvanometer needle, or equivalent, is free to respond to changes in the condition being recorded or controlled; more specifically, the needle is clamped for only a short part, preferably constant, of the cycle, and mechanism for moving the clutch member to rebalance the apparatus completes its operation within a small part of the cycle, leaving the needle free, i. e., from mechanical restraint, and of the effect of the rebalancing action, for a large percentage of the cycle; a high sensitivity galvanometer may be used, the long free time of the needle affording ample time for the moving system of the galvanometer, which has a long natural period for high sensitivity, fully to respond; so that accurate readings of even very small changes can be obtained, and so that with fewer cycles of operation large changes are recordable or large control increments are effected. In brief, the parts of a cycle are of such character and of such relative durations that both high sensitivity and high speed recording and/or control are attained.

Further in accordance with my invention, when the recorder pen, or other controlled structure, driven through the clutch reaches a limit of its movement, the clutch setting mechanism is disabled so long as the tendency is to effect further movement of the pen or structure in the same direction.

Also in accordance with my invention, an impedance for standardizing the current flowing through the measuring circuit is automatically adjusted from time to time by the recorder mechanism itself, with provision for its adjustment whenever desired, either manually or semi-automatically; in the latter case, the operator performs a simple operation, as pressing of a button, while the recorder performs the actual restandardizing adjustment.

My invention also resides in the features of construction, operation, and arrangement hereinafter described and claimed.

For an understanding of my invention and for illustration of a preferred form thereof, reference is to be had to the accompanying drawings in which.

Figure 1:
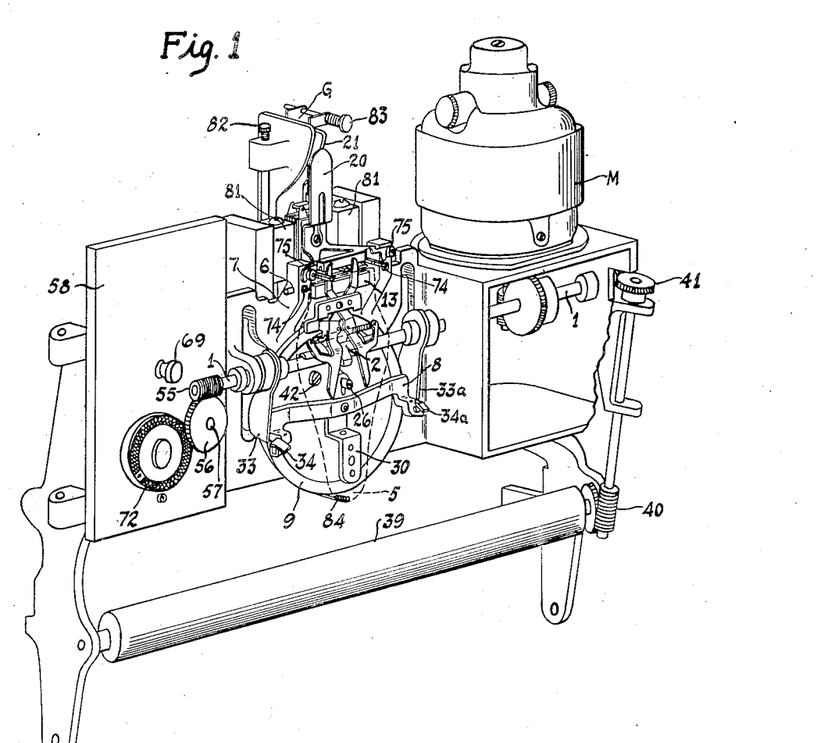
Fig. 1 is a front view, in perspective, with parts broken away, of a recorder mechanism utilizing the invention.
Figures 2, 16:
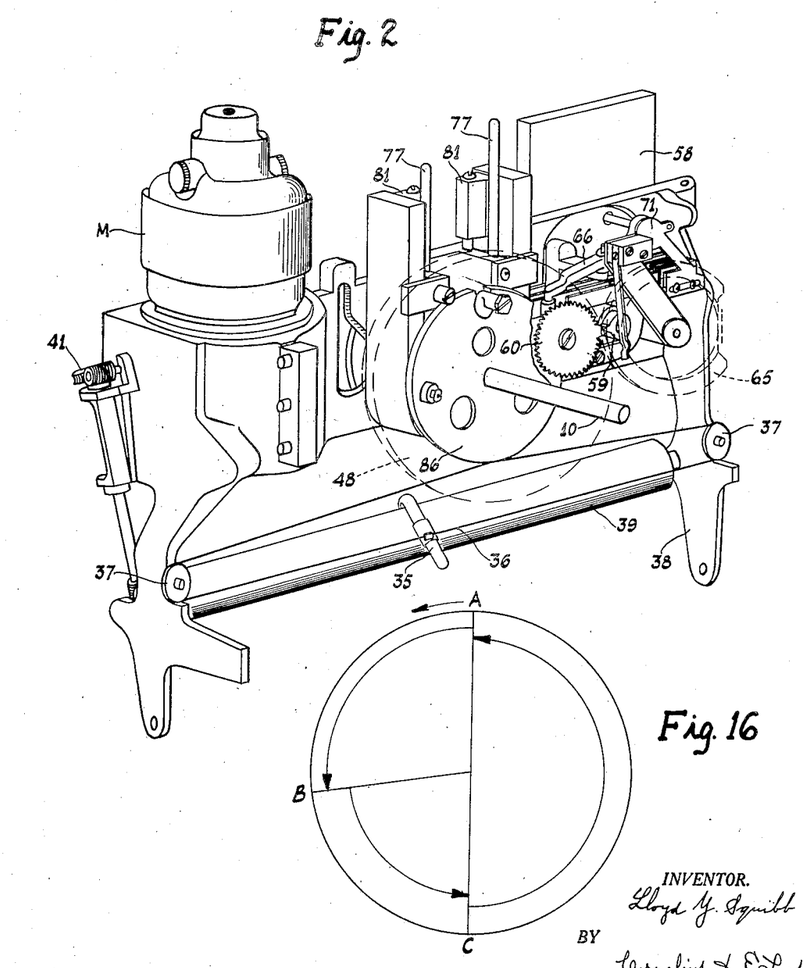
Fig. 2 is a rear view, in perspective, of the apparatus shown in Fig. 1, with parts omitted.
Fig. 16 is a cycle diagram.
Figure 3:
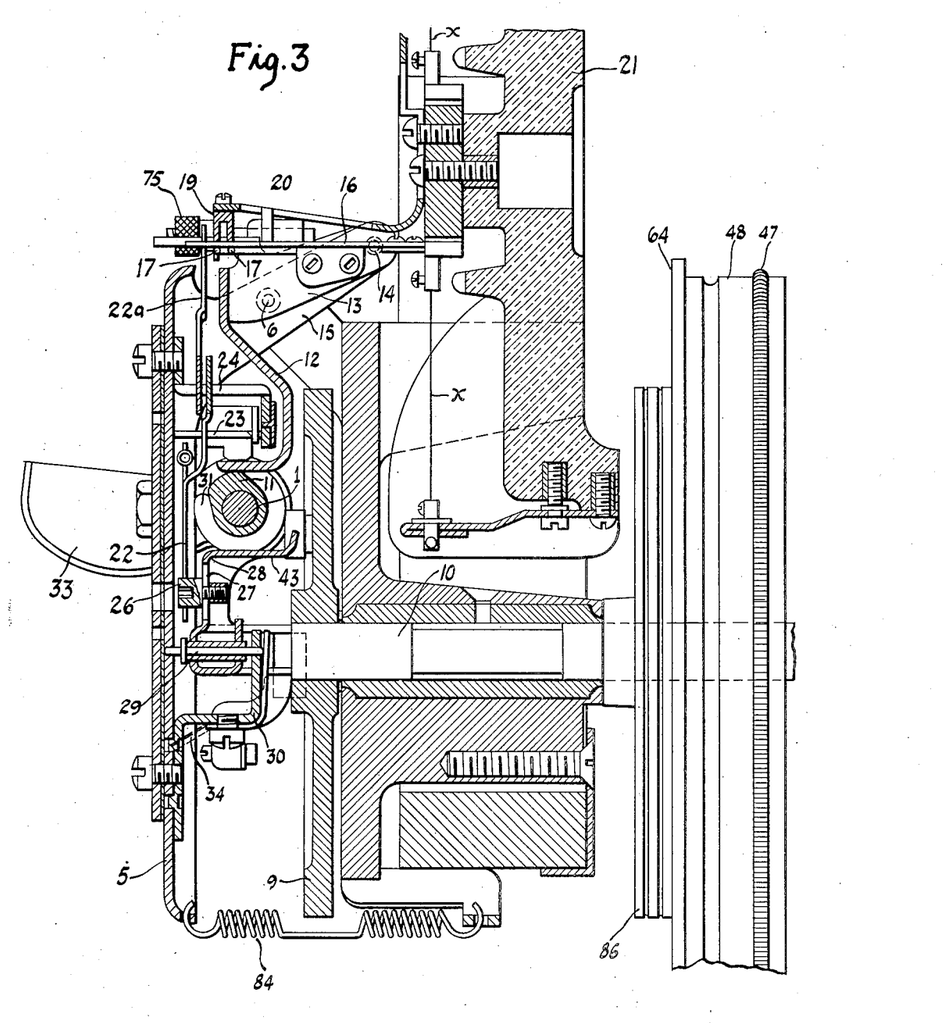
Fig. 3 is a side elevational view, on enlarged scale, and in section, illustrating details of mechanism shown in Fig. 1.
Figures 6, 8, 9, 10, 11:
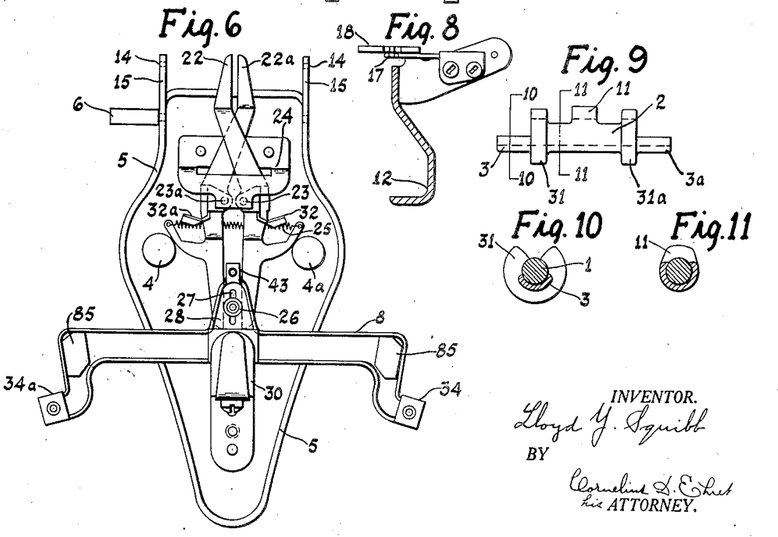
Fig. 6 is a rear view, with parts omitted, of a unit of the mechanism shown in Fig. 3.
Fig. 8 is a side elevational view, taken on line 8—8 of Fig. 7.
Fig. 9 is a detail view of a cam for operating the mechanism shown in Fig. 3.
Figs. 10 and 11 are sectional views taken respectively on lines 10—10 and 11—11 of Fig. 9.

Referring particularly to Figs. 1, 2 and 3, the main shaft 1 which is driven at constant speed by the motor M, carries the cam 2, shown in detail in Figs. 9, 10, and 11, having the cam elements 3, 3a, which engage the followers 4 and 4a, (Fig. 6), carried by the supporting member 5 which is pivotally mounted on pins 6, 6, received by projections 7 of the main frame member of the instrument.

For a substantial portion of each revolution of shaft 1, the cams 3, 3a hold the member 5, in opposition to the action of the biasing spring 84, outwardly, as viewed in Fig 1, to maintain disengagement between the clutch shoes 85, 85 (Fig. 6) carried by the arm 8 pivotally mounted upon member 5, and the clutch disk 9, which, as shown more clearly in Fig. 3, is secured to the front end of the shaft 10.

During the interval of clutch disengagement, the lift of cam element 11 of cam 2, engages the depending arm 12 of member 13, (Figs. 3, 7 and 8), which is pivoted at 14 to the inwardly directed arms 15 of the pivoted supporting member 5. The continued engagement raises member 13 to clamp the galvanometer pointer 16 against the stationary clamping bar 19 suitably fastened to the outer end of the member 20 secured to the galvanometer assembly 21. Preferably, the stationary clamp bar 19 is grooved, and the movable clamping member comprises the wires 17, 17 extending between arms 18, 18 of member 13. By this arrangement the clamping is firm, but without any shearing action upon the pointer. Further, the wires being slightly flexible ensure positive clamping despite wear of the moving parts.

Referring particularly to Fig. 6, the feelers 22, 22a for setting the clutch arm 8 in accordance with the galvanometer deflection, are pivoted upon pins 23, 23a supported by the bracket 24, secured to the rear face of the supporting member 5. Spring 25 tends to pull the upper ends of the feelers, which are crossed, scissors-fashion, toward each other, as shown in Fig. 6, toward opposite sides of pointer 16 which is between them. The lower ends of the feelers may engage the opposite sides of a pin or stop 26, adjustable in a slot 27 of an upwardly extending arm 28 of clutch member 8 which is pivotally mounted upon a pin 29 supported by the bracket 30 extending from member 5.

The cam elements 31, 31a of cam 2 which engage respectively the arms 32, 32a, extending from the feelers, are so shaped that the feelers are held in their open position for the major part of the operating cycle, leaving the galvanometer needle free to assume any position determined by the measuring system as best shown in Fig. 1. Immediately after the needle is clamped, as above described, the arms 32, 32a of the feelers drop off the high parts of cams 31, 31a permitting the spring 25 to move the feelers toward one another. Assuming the needle has deflected to the left of its central or neutral position, as viewed in Fig. 6, its left edge is engaged by feeler 22, as viewed in Fig. 6, and since the needle is clamped, it acts as a stop. The spring 25 is therefore effective to move the other, or free, feeler 22a, more or less to the left beyond its normal position shown in Fig. 6, the lower end of the free feeler moving to the right of its normal position shown in Fig. 6. In so doing, the free feeler engages pin 26 and rotates clutch arm 8 clockwise. The greater the deflection of the galvanometer needle from its neutral position, the greater the movement of feeler 22a and clutch arm 8. The ratio of the extent of movement of member 8 to the galvanometer deflection may be adjusted by changing the position of pin 26 in its slot 27. The ends of the arm 8 are offset so that they may pass to the rear of shaft 1, thus increasing the range of movement of arm 8 for large deflections of the pointer and decreasing the number of steps necessary to approach balance of the instrument, hereinafter more fully discussed.

Similarly, if the needle is clamped to the right of its neutral or central position, it acts as a stop for feeler 22a, and the other or free feeler by action of spring 25 effects rotation of clutch member 8 in a counter-clockwise or reverse direction, and to an extent related to the departure of the needle from its normal or neutral position.

As the only force or pressure exerted against the edges of the needle is due to the spring 25, there is negligible wear and accordingly the accuracy and sensitivity of the instrument remains high for a practically indefinite period.

After this setting of the clutch member 8, which is practically instantaneous, the cam followers 4 and 4a of the supporting member 5 ride off the high parts of the cams 3 and 3a, and so permit the spring 84 (Figs. 1 and 3) to effect engagement between the clutch shoes 85, 85 and the face of clutch disk 9. Substantially immediately thereafter, the feelers are again spread by cams 31, 31a and the needle released from mechanical restraint. The period during which the needle is clamped is a small part of the cycle, for example, one-fourth, which leaves it ample time to deflect to a new position. This is of importance for the more sensitive the instrument, the lighter its coil suspensions $x$, $x$ and the longer its natural period. For the apparatus shown, the cycle consumes about two seconds, and the needle is free for about one and one-half seconds.

One of the restoring cams 33, 33a depending upon the position to which clutch member 8 has been moved, engages one or the other of the extensions 34, 34a at the opposite ends of clutch arm 8, and upon continued rotation restores the clutch arm 8 to its horizontal or normal position shown in Fig. 6, and therefore effects rotation of the clutch disk 9 through an angle corresponding to the angle through which the arm 8 was moved by one or the other of the feelers, as previously described. The cams 33, 33a, as shown, have a very steep rise so that even though arm 8 has been moved to one of its limiting positions, its resetting is accomplished in about 90° rotation of shaft 1. This feature is of importance because the resetting changes current conditions in the measuring circuit and this time should be short to leave the galvanometer entirely free to respond to changes of the condition being measured.

The movement of clutch disk 9 by cams 33 or 33a may be utilized to produce an indication, record or control of the change in condition which was responsible for the galvanometer deflection. The re-setting of the clutch member 8 completes the operating cycle, which thereupon repeats continuously as long as the apparatus is in operation.

The arrangement shown for effecting movement of a recorder pen is generally the same as that described in Leeds Patent No. 1,125,699. Briefly, the recorder pen 35, stylus, or equivalent, suitably fastened to a cord 36 which passes over the idler pulleys 37 at opposite ends of the frame 38 for the apparatus, and around a pulley 86, Figs. 2 and 3, suitably fastened to the shaft 10 of disk 9. The platen 39 which is driven from motor M by gearing 40 and 41 feeds the recorder sheet, not shown, beneath the pen. A stationary scale may be substituted for the moving scale of a recorder sheet and a pointer, or the like, may replace pen 35. The arrangement shown is extremely sensitive and will detect pointer deflections as small as .001 inch and, for large deflections, is capable of effecting large steps rapidly to approach balance.

Figure 12:
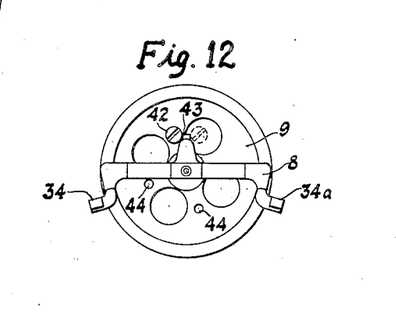
Fig. 12 is a detail view, in front elevation, of the clutch disabling means shown in Figs. 1 and 3.

The stop pin 42, Fig. 12, projects from the front face of the clutch disk, and is adapted to engage the rearwardly extending arm 43 of the driving clutch member 8, at both extremes of movement of the recorder pen 35. Assuming that the magnitude of temperature, for example, is beyond the range of the instrument; the driving clutch member 8 has been repeatedly moved in a counter-clockwise direction by one of the feelers, the pin 42 finally reaches the position shown in full line and the pen 35 one limit of its travel. Even though the pointer thereafter continues to deflect in a sense which would ordinarily result in further movements of clutch member 8 in a counter-clockwise direction, the free feeler is incapable of effecting such movement, because of the obstruction offered by the stop 42. However, as soon as the pointer deflects in an opposite direction, this disablement of the apparatus no longer obtains for the stop 42 does not obstruct movement of member 8 in a clockwise direction, to effect reverse movement of pen 35. By this provision, wear on the clutch shoes 85, 85 which are usually of cork, by slippage, is prevented. Heretofore, when the pen reached the limits of its travel the clutch arm 8 or equivalent was not disabled, with the result that the restoring cams forced the driving clutch member to its neutral position dragging the clutch shoes along the blocked clutch disk 9.

Clutch disk 9 may be provided with holes 44 for receiving other stop pins to change or narrow the limits of movement of the recorder pen before reaching its normal limit of travel. This is of advantage in certain fields of use of the instrument, for example, for recording the temperature of hot bodies, intermittently passed before a pyrometer electrically connected to the recorder.

The needle or pointer 16 may be that of any instrument responsive directly or indirectly, to a physical, electrical, chemical, or other condition; with provision for rebalancing the forces acting on the needle as a result of the operation of clutch members 8, 9, or equivalent. For example, the needle 16 may be the needle of a flowmeter, as in Bristol patent 1,542,030 in which the needle is rebalanced by a change of a magnetic force resulting from readjustment of a resistance under the control of driving and driven clutch members; or it may be the pointer of a Bourdon tube, as in Bristol Patent No. 1,892,135 in which the needle is rebalanced by a spring whose tension is varied by a cam on the shaft of the driven clutch member.

The arrangement specifically shown, is used with an electrical network, such as a Wheatstone bridge or potentiometer, and the balancing resistance of the network is carried by shaft 10, so that upon deflection of the galvanometer needle, the mechanism above described is effective to adjust the circuit to balance, bringing the galvanometer needle back to its neutral or zero position. For the greater deflections, the rebalancing may require several complete cycles of operation, the pen moving by steps to record the changes of the condition under measurement. Because of the long free period of the needle, and of the great sweep of cams 33, 33a the number of steps is materially less than for other instruments of the same general type, as exemplified by the aforesaid Leeds patent.

Figures 4, 5, 7:
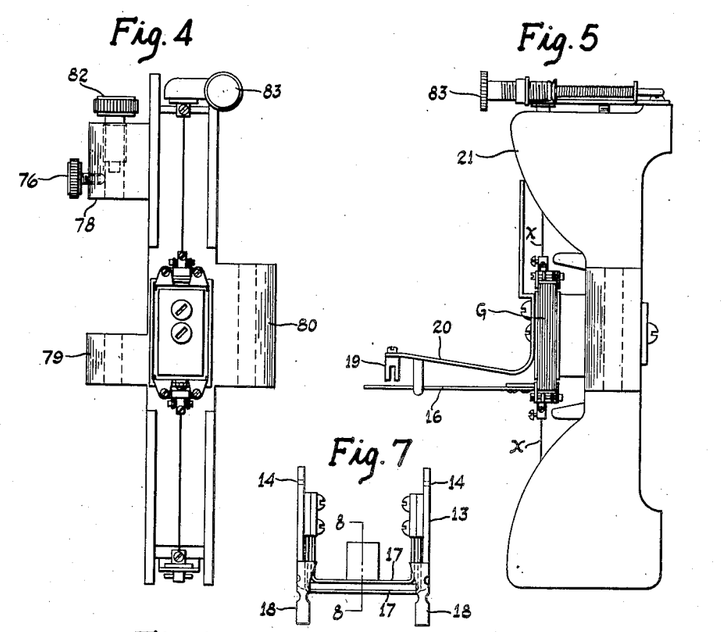
Figs. 4 and 5 are front and side elevational views respectively of the galvanometer assembly shown in Fig. 1.
Fig. 7 is a plan view of the pointer-clamping mechanism shown in Fig. 3.

If for any reason, it is desired to repair or replace the galvanometer, the assembly 21 shown in Figs. 4 and 5 may be removed as a unit simply by loosening nuts 75, 75 (Figs. 1 and 3) holding the ends of the upper clamping bar frame to the main frame extensions 7, (Fig. 1), and thumb-screw 76. The guide rods 77, 77 (Fig. 2) which are received by the lugs 78, 79, 80 of the unit ensure proper position of the coil with respect to the pole pieces 81, 81, and prevent damage to the coil and its suspension system in the removal or replacement. The screw 82 is for adjusting the position of the pointer with respect to the needle clamping elements, and screw 83 permits setting of the needle to zero or neutral position.

With the galvanometer assembly removed, the balancing mechanism comprising the clamping system, the feelers, and the driving clutch member may be removed as a unit, (Fig. 6) simply by loosening the screws 74, 74 holding the pivot pins 6 for the supporting member 5.

All of the cams for operating the balancing mechanism, Fig. 9, are integral so that there is no possibility of change in the timing.

Referring to Fig. 16, in which 360° represent, by way of example, one complete cycle of the operation of the apparatus above described, the arc between points A and B represents the portion of the cycle during which needle 16 is mechanically clamped by members 17 and 19. During this interval, which is constant regardless of the needle's deflection, the feelers 22, 22a operate; one of them engaging the deflected pointer and the other moving the driving clutch member 8 for a distance varying in accordance with the extent of deflection of the needle.

Assuming maximum deflection, the slide wire movement begins substantially at B and continues to C, for an angle of approximately 90°. The galvanometer needle is therefore free to respond to any change in the measured condition occurring after the time corresponding to point A and to assume its position representative of the new magnitude of the condition to be measured, during the long interval represented by the large arc C—A, approximately 180°; i. e., the needle is free of mechanical restraint and of the effect of the slide wire movement, to the position determined by the last prior deflection of the needle, for a much larger part of the cycle than heretofore usual with mechanisms of this general type. The part of the cycle for which the needle is not free to move in accordance with a new magnitude of the condition under measurement, i. e., from the beginning of the clamping period to the end of the rebalancing period is never greater than approximately 180°, regardless of the extent of needle deflection.

This gives the needle ample time to respond fully to the unbalanced forces of the measuring system, or to deflect to the full extent of its arc if the unbalance is so great that more than one cycle of operation is necessary for a rebalance. Since the extent of slide wire movement, or mechanical stepping, is directly related to the extent of galvanometer deflection, the longer free time of the needle substantially increases the speed of recording a change in the measured condition and/or effecting a control; i. e., the system attains a condition of balance at the new magnitude of a condition in fewer steps, or cycles of operation.

The long "free" time makes feasible the use of a high sensitivity galvanometer; high sensitivity previously was not employed to advantage because the natural period of oscillation for high sensivity is so low that the "free" time of the needle of prior arrangements was insufficient to make use of high sensitivity by allowing the needle to come to rest before clamping. In my apparatus, with a high sensitivity galvanometer, accurate readings of very small changes are possible, and in addition, because of the long free time, the needle is able fully to respond to large changes so that the system is balanced in fewer steps, or cycles of operation. In brief, the instrument is a high sensitivity, high speed recorder and/or controller; for example, in the particular apparatus shown, the complete cycle of operation is only about two seconds and the needle is entirely free for about one second or more.

Figure 15:
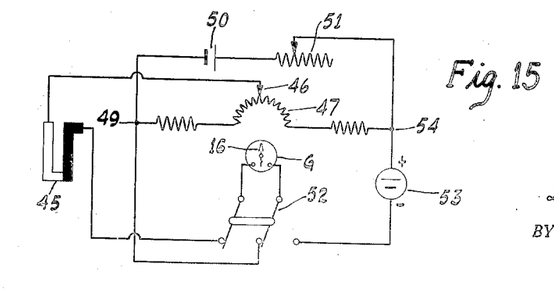
Fig. 15 is a diagram of the measuring and standardizing circuits.

Referring to Fig. 15, the thermocouple 45 for measuring temperature is connected in series with the galvanometer G between the contact 46 on the slide wire 47, which in Fig. 3 is mounted upon the disk 48 upon shaft 10, and the point 49 of the potentiometer network. The slide wire 47 is connected in series with the source of current 50 through a variable resistance 51, having the purpose hereinafter specified. If the drop of potential between the point 49 and slide wire contact 46 is not equal to that developed by the thermocouple, the needle 16 of galvanometer G deflects in one sense or the other, depending upon whether the thermocouple voltage is higher or lower, with the result that the mechanism described effects the re-adjustment of the slide wire contact until the galvanometer needle 16 remains in its neutral position. The movement, or step by step movements, of shaft 10 in establishing balance, effect, as above described, movement of the recorder pen, or equivalent.

It is necessary from time to time to compensate for aging of battery 50, or in general to compensate for a change in the current traversing the slide wire resistance, to insure correct readings and to that end, it is usual to recalibrate the apparatus by comparing the voltage across a portion of the potentiometer circuit with that of a standard cell, and adjusting the current through the circuit by varying resistance 51 in series with it, until balance is effected. In the arrangement shown in Fig. 15, the double-pole, double-throw switch 52 is thrown to the right, for re-calibration, to connect the galvanometer in series with the standard cell 53 between the points 49 and 54, whose potentials are directly related to those of the slide wire terminals. In the recording apparatus shown, there is provided an arrangement for automatically, semi-automatically, or manually effecting this recalibration of the instrument.

Figure 13:
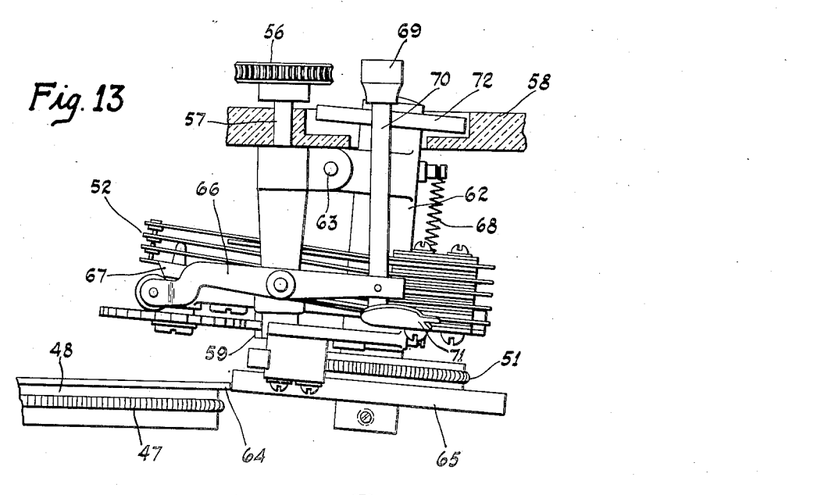
Figs. 13 and 14 are, on enlarged scale, top plan, and rear elevational views respectively, of the standardizing mechanism shown in Fig. 2.
Figure 14:
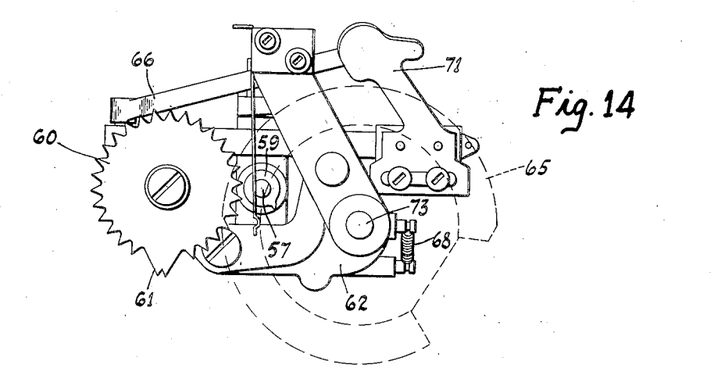

Referring to Fig. 1, the worm 55 at the left hand end of shaft 1 drives the worm gear 56 mounted on the front end of shaft 57 which projects rearwardly through the panel 58. Upon the rear end of the shaft, as shown most clearly in Figs. 2, 13, and 14, is mounted a tooth gear 59, which engages the gear 60, advancing it one tooth for each revolution of shaft 57. When gear 60 has rotated to such extent that the large tooth 61 is engaged by the single tooth gear 59, the latter tends to push the gear 60 to the left, as viewed in Fig. 14, and thereby causes the frame 62 carrying the gear to be swung clockwise about its pivot 63, as viewed in Fig. 13. The extent of movement is sufficient to effect frictional driving engagement between the rim 64 of the slide wire disk 48 and the edge of the disk 65 carrying the calibrating resistance 51.

This movement of gear 60 also rocks a pivoted arm 66 which engages cam 67 to change the position of the elements of switch 52 from "measuring" to "calibrating" position (Fig. 15).

The relation of gears 59, 60 and the speed of the latter, is such that this position of the frame 62 and arm 66 is maintained for several revolutions of cam shaft 1. If the current from battery 50 through the slide wire is not proper the galvanometer needle deflects, and since the slide wire disk drives the disk 65 of the calibrating rheostat 51, its movement in response to the unbalance, changes the potentiometer current in the right direction to insure accurate readings. At the end of the calibration interval, the tooth of gear 59 moves out of engagement with the high tooth 61 of gear 60, permitting the frame 62 to return under the influence of its biasing spring 68 to its normal position.

With the apparatus in continuous operation, the measuring circuit is automatically periodically calibrated at suitable intervals, for example, every half-hour or three-quarters of an hour. It is desirable under certain circumstances, to effect immediate calibration without waiting for such a relatively long period of time.

Whenever desired, the button 69 extending from the front of panel 58 may be pressed to effect semi-automatic calibration. The rearward movement of button 69 causes the arm 66 to shift the position of the contact of switch 52 to include the galvanometer in circuit with the standard cell 53, and at the same time the rear end of shaft 70 engages the upper end of arm 71 carried by frame 62, causing the frame to swing clockwise, to effect engagement between the slide wire disk 48 and the calibration rheostat disk 65. It is simply necessary to hold the button in for several revolutions of cam shaft 1, during which time the instrument, as above described, effects precise calibration. To restore the instrument to measuring condition, the button 69 is released.

The instrument may be calibrated manually by depressing button 69, and rotating the disk 72 at the forward end of the shaft 73 carrying the rheostat 51. However, the calibration effected by the automatic or semi-automatic methods is more precise as the instrument can detect smaller deflections of the pointer 16 than can be readily observed; for example, the instrument will respond to galvanometer deflections of the order of 1/1000th of an inch, which would be imperceptible to the ordinary observer.

A desirable method of adjustment of the mechanism shown in Fig. 1 which eliminates the effect of lost motion in the balancing mechanism, for example, clearance between the pointer and the feelers when in closed position (Fig. 6) is as follows: with the galvanometer electrically inoperative, the screws 74 (Fig. 1) are loosened and the feeler mounting or balancing assembly (Fig. 6) shifted slightly in one direction or the other to bring one of the feelers to bear against the needle so that as shaft 1 revolves, the arm 8 swings in a small arc and the pen or stylus 35 takes small steps across the chart in one direction; the screw 83 of the torsion head of the galvanometer is then adjusted to decrease the steps and the adjustment is discontinued as soon as the stepping stops.

Assuming that the adjustment is such that the right edge of the needle is engaged by feeler 22

(Fig. 1), when the instrument is then put into recording service, if the needle deflects to the right from the adjusted normal, it is engaged by feeler 22; for small deflections to the left, it is still engaged by feeler 22 because of the bias of the balancing mechanism; as soon as the deflection to the left is greater than the clearance between the feelers, which may be only a few thousandths of an inch, the other side of the needle is engaged by the other feeler. The needle is engaged by one feeler or the other in every cycle even though the needle is narrower than the spacing between the tips of the feelers. This mode of eliminating the effect of lost motion or clearance does not affect the accuracy of measuring for it is purely mechanical and does not in any way modify the condition of balance in the measuring circuit.

In the absence of such adjustment, small needle deflections, i. e., within the clearance between the needle and feelers, will not effect response of the recorder. To eliminate all clearance by highly precise machining and adjustment is commercially impossible and in any event frequent supervision would be necessary. With the foregoing apparatus, adjusted as above described, the precision of measuring is as high as could be obtained by super-precise machining, fitting and adjustment.

What I claim is:

1. An instrument having a movable member, a pair of feelers intermittently moved away from each other on opposite sides of said member, means for biasing said feelers toward each other and for moving one of said feelers when the other engages said movable member, and structure moved in one direction or the other depending upon which of said feelers is moved by said biasing means.

2. An instrument having a movable member, a pair of feelers intermittently moved away from each other on opposite sides of said member, spring means for biasing said feelers toward each other and for moving either one of said feelers when the other engages said movable member, and structure engaged and moved by said one of said feelers.

3. An instrument comprising a pair of crossed feelers each pivoted intermediate its ends, a movable member positioned between one pair of ends of said feelers, movable structure positioned between the other pair of ends of said feelers, means for intermittently operating said feelers to move the ends thereof away from each other and from said movable member and movable structure, and means for moving either of said feelers when the other engages said movable member thereby to effect movement of said movable structure.

4. An instrument comprising a pair of pivoted feelers, movable structure, means for biasing said feelers toward each other and into engagement with opposite sides of said structure, means for intermittently moving said feelers away from each other and said movable structure, and a movable member for engaging one or the other of said feelers depending upon the sense of its deflection from a neutral position whereby the other of said feelers is moved by said biasing means into engagement with said structure for moving it as said feeler continues to move toward the engaged feeler.

5. An instrument comprising a member adapted to move in either direction from a neutral position, a rotatable member having an abutment, a pair of pivoted feelers on opposite sides of said member and said abutment, means for intermittently moving said feelers away from said movable member and said abutment and means for moving either one of said feelers when the other is engaged by said movable member, to effect movement of said rotatable member by engagement between said abutment and the moving feeler.

6. An instrument having a deflecting member, means for periodically clamping said member, a pair of feelers on opposite sides of said member and biased toward each other, means operative when said member is held by said clamping means for releasing said feelers whereby one of said feelers engages the deflected member and the other continues to move, and structure engaged and moved by the latter feeler.

7. An instrument having a deflecting member, a pair of feelers on opposite sides of said member, driving and driven clutch members, integral cam structure for effecting, periodically and alternately, movement of said feelers away from each other and engagement between said clutch members, and means for moving one of said feelers to set the disengaged driving clutch member upon engagement of the other feeler with said deflecting member.

8. An instrument having a deflecting member, means for clamping said member, a pair of feelers on opposite sides of said member, driving and driven clutch members, integral cam structure for effecting periodically, operation of said clamping means, movement of said feelers away from each other, and disengagement between said clutch members, and means for moving one of said feelers to set the disengaged driving clutch member upon engagement between the other feeler and the deflecting member while clamped.

9. An instrument having a deflecting member, a pair of feelers on opposite sides of said member and biased toward each other, driving and driven clutch members, means for moving one of said feelers to set the driving clutch member upon engagement between the other feeler and said deflecting member, and means for actuating the said driving clutch member to move said driven clutch member, and an indication-producing member moved by said driven clutch member.

10. An instrument having a deflecting member, a pair of feelers on opposite sides of said member, driving and driven clutch elements, means for moving one of said feelers to set the driving clutch element upon engagement between the other feeler and said deflecting member, and cam means for actuating the driving clutch element to move said driven clutch element completing its movement for even large deflections of said member in a small proportion of the operating cycle.

11. An instrument having a deflecting member, means for clamping said member, a pair of feelers on opposite sides of said member, driving and driven clutch elements, means for moving one of said feelers to set the driving clutch element upon engagement between the other feeler and said deflecting member, and cam means for periodically actuating said clamping means and for actuating the driving clutch element to move said driven clutch element, both of said operations being completed in substantially half of the cycle to leave said deflecting member free to assume a new position for a substantial part of the cycle.

12. An instrument having a deflecting member, driving and driven clutch members, setting means for said driving clutch member controlled by said deflecting member, mechanism for actuating said driving clutch member to move said driven clutch member, and means for preventing slippage between said clutch members operative when said driven clutch member reaches a limit of its travel in one direction.

13. A system comprising a galvanometer, a measuring circuit, movable structure, actuating means therefor controlled by said galvanometer, a variable impedance for controlling the current in said circuit, means for intermittently coupling said variable impedance to said movable structure and shifting the galvanometer connections whereby the system standardizes said current for subsequent measurements, and means manually operable to couple said variable impedance to said movable structure and to change the galvanometer connection whereby the system standardizes said current for subsequent measurements.

14. A system comprising a galvanometer, a measuring circuit, movable structure, actuating means therefor controlled by said galvanometer, an impedance manually variable to adjust the current in said circuit, means for intermittently coupling said variable impedance to said movable structure and shifting the galvanometer connections whereby the system standardizes said current, and means manually operable to couple said variable impedance to said movable structure and to change the galvanometer connections whereby the system standardizes said current.

15. A system comprising a galvanometer, a measuring circuit, rotatable structure, actuating means therefor controlled by said galvanometer, a variable impedance for controlling the current in said circuit having a rotatable operating member, and means for intermittently rocking said member to effect engagement with said rotatable structure, and for concurrently changing the circuit connections whereby said current is standardized for subsequent measurements.

16. An instrument comprising a deflecting member, a pair of feelers on opposite sides of said member, structure engaged and moved by one of said feelers when the other engages said deflecting member, and a common mounting for said feelers and said structure to permit their removal as a unit from said instrument.

17. An instrument comprising a deflecting member, a movable clamping element therefor, a pair of feelers on opposite sides of said member, structure engaged and moved by one of said feelers when the other engages said deflecting member, and a common mounting for said clamping element, said feelers and said structure to permit their removal as a unit from said instrument.

18. An instrument comprising a deflecting member, fixed and movable elements for clamping said member, and a common mounting for said member and one of said elements to permit their removal as a unit from the instrument.

19. An instrument comprising a deflecting member, fixed and movable elements for clamping said member, a pair of feelers on opposite sides of said member, structure engaged and moved by one of said feelers when the other engages said deflecting member, a common mounting for said deflecting member and said fixed clamping element to permit their removal as a unit from the instrument, and a common mounting for said movable clamping element, said feelers, and said structure for permitting their removal as a unit from the instrument.

20. Apparatus comprising a high sensitivity instrument having a deflecting needle, mechanism for periodically clamping said needle, structure adjustable to rebalance forces whose unbalance effects deflection of the needle, and means, including a feeler engaging the deflected needle while clamped, for adjusting said structure, said clamping mechanism and said structure adjusting means completing their operations to leave the needle free, regardless of the extent of its deflection, for a period in each complete cycle of operation not less than the natural period of the needle.

21. Apparatus comprising a high sensitivity galvanometer, mechanism for periodically clamping the needle of said galvanometer, a slide wire, and means including a feeler engaging the needle while clamped for adjusting the slide wire in accordance with the needle's deflection, said clamping mechanism and said slidewire adjusting means completing their operations to leave the needle free, regardless of the extent of its deflection, for a period in each complete cycle of operation not less than the natural period of the needle.

22. Apparatus comprising a galvanometer, mechanism for periodically clamping the needle of said galvanometer, a driving clutch member, a driven clutch member, means for engaging said needle while clamped by said mechanism to displace said driving clutch member, from neutral position in accordance with the needle deflection, and means for restoring the driving clutch member to neutral position while in engagement with the driven clutch member, said clamping mechanism and said restoring means completing their operations in a period leaving the needle free for more than one-quarter of the complete cycle of operation of the instrument regardless of the extent of its deflection.

23. Apparatus comprising a high sensitivity galvanometer, mechanism for periodically clamping the needle of said galvanometer, a driving clutch member, a driven clutch member, means for engaging the needle while clamped by said mechanism to displace said driving clutch member from neutral position in accordance with the needle deflection, and means for restoring the driving clutch member to neutral position while in engagement with the driven clutch member, the clamping mechanism and said restoring means completing their operations to leave the needle free regardless of the extent of its deflection for a period in each complete cycle of operation not less than the natural period of the needle.

24. In apparatus of the character described, having a galvanometer with a pointer, controlled structure, and balancing mechanism for effecting step-by-step movement of said structure upon deflections of said pointer, and including feelers for engaging the pointer, the method of eliminating the effect of lost motion in the balancing mechanism which comprises adjusting the neutral position of the feelers to produce small steps of said controlled structure in one direction, adjusting the neutral of the galvanometer pointer to cause said step of said controlled structure to progressively diminish, and discontinuing said pointer adjustment when said steps diminish to zero.

25. In apparatus of the character descrbed, having a galvanometer with a pointer, controlled structure, and balancing mechanism for effecting step-by-step movement of said structure upon deflection of said pointer, and including feelers for engaging the pointer, the method of eliminating the effect of clearance between the feeler and said pointer for small deflections of the pointer which comprises changing the neutral position of the feelers to an extent greater than said clearance to effect small steps of said controlled structure in one direction, then adjusting the neutral of the galvanometer pointer to diminish said steps, and discontinuing said pointer adjustment when said steps diminish to zero.

26. Apparatus of the character described comprising a galvanometer having a deflecting pointer, means for periodically clamping said pointer, controlled structure, balancing mechanism for effecting step-by-step movement of said structure in accordance with deflections of said pointer including feelers adapted to engage opposite sides of said pointer, a mounting for said feelers manually adjustable to effect engagement between one of them and said pointer to cause stepping of said structure in one direction, and means for adjusting the neutral position of said pointer operable manually in setting up the apparatus to decrease said stepping until it becomes zero.

27. An instrument having a deflecting member, driving and driven clutch members, setting means for said driving clutch member controlled by said deflecting member, mechanism for actuating said driving clutch member to move said driven clutch member to an extent and in a direction determined by the setting of said driving clutch member, and means operative when said driven clutch member reaches a limit of its travel in one direction to prevent said setting means from setting said driving clutch member for further movement of said driven clutch member in said one direction but allowing said setting means to set said driving clutch member for movement in reverse direction.

28. An instrument having a deflecting member movable in opposite directions from a neutral position, a pair of feelers intermittently moved away from each other on opposite sides of said member, means for biasing said feelers toward each other and for moving one of said feelers when the other engages said deflecting member, and structure moved in one direction or the other from a neutral position depending upon which of said feelers is moved by said biasing means.

29. An instrument comprising a pair of pivoted feelers, pivoted structure movable in either direction from a neutral position, means for biasing said feelers toward each other and toward engagement with said structure, means for intermittently moving said feelers away from each other and said movable structure, and a deflecting member for arresting one or the other of said feelers depending upon the sense of its deflection from a neutral position whereupon the other of said feelers engages and moves said structure from its neutral position.

30. An instrument having a deflecting member movable in opposite directions from a neutral position, means for periodically clamping said deflecting member, a pair of feelers on opposite sides of said member and biased toward each other, means operative while said member is held by said clamp means to release said feelers whereby one of them, depending upon the sense of deflection of said member, is arrested by said member and the other continues to move, and structure engaged at and moved from its neutral position by said latter feeler.

LLOYD Y. SQUIBB.